INVENTOR

BY

ATTORNEY 3,421,767
HEAD COVER ARRANGEMENT ON MAGNETIC TAPE RECORDER

Katsuya Atsumi, Tokyo, Japan, assignor to Akai Electric Company Limited, Tokyo, Japan Filed Dec. 28, 1965, Ser. No. 516,957
Claims priority, application Japan, Dec. 31, 1964, 39/74,792
U.S. Cl. 274—4 7 Claims
Int. Cl. G11b *5/10*

ABSTRACT OF THE DISCLOSURE

A magnetic tape recording and reproducing machine has a cover for protecting the magnetic heads and other related mechanical parts from impact and dust. The cover forms a box-like chamber, one portion of which is movable to an open position in order to expose the tape for threading purposes. As the cover portion moves to the open position the tape is automatically freed from any gripping means and from contact with the magnetic heads.

This invention relates to improvements in or relating to magnetic recording and playback machines. More specifically, it relates to improvements in the cover arrangement for detachably housing the magnetic head group on the machine of the above mentioned kind.

In the conventional art, the head group and its directly related mechanical parts are seen from outside even when the machine runs. Such a head cover arrangement as this will provide poor appearance as a whole, and further gives rise to the deposition of considerable dirty particles on the delicate surfaces of the magnetic heads as well as the related mechanical parts, thereby gradually reducing the performance of the machine.

In the conventional machines of the above kind, there has been a recent strong tendency to adopt the so-called impedance roll having a larger rotational inertia and arranged in advance of the head group, so as to assure a low, constant tape delivery speed from the tape supply reel. It is still further a well established practice to employ the so-called tension arm mechanism arranged between the tape supply reel and the impedance roller for assuring a more intimate contact of the tape with the roller, so as to provide a stronger tension to the tape. In the conventional machine, the tension arm is kept in its off-service position by a spring means while the machine is not operated. When it is desired to operate the machine either for recording or reproducing with a newly threaded tape, the tension arm must be brought to its operative position each time by manipulating it against the spring action so as to engage with the tape. This kind of manual operation of the tension arm is, without a doubt, a highly troublesome procedure to those who are desirous of operating such kind of machines.

It is the main object of the present invention to provide an improved head cover arrangement adapted to cover the head group as well as directly related mechanical parts of a magnetic recording and reproducing machine, even when the cover has been opened, and further to completely house these parts in such a manner that none of these parts are visible from the outside.

Another object is to provide a head cover arrangement of the nature above referred to, capable of eliminating the difficulties experienced in the prior art devices during the operation of manually bringing the tension arm from its off service position to its operative position each time it is desired to operate the tape recorder upon threading a new tape.

These and further objects, features and advantages of the invention will be more apparent to those skilled in the art from a consideration of the following detailed description when taken together with the accompanying drawings in which.

Figure 1:
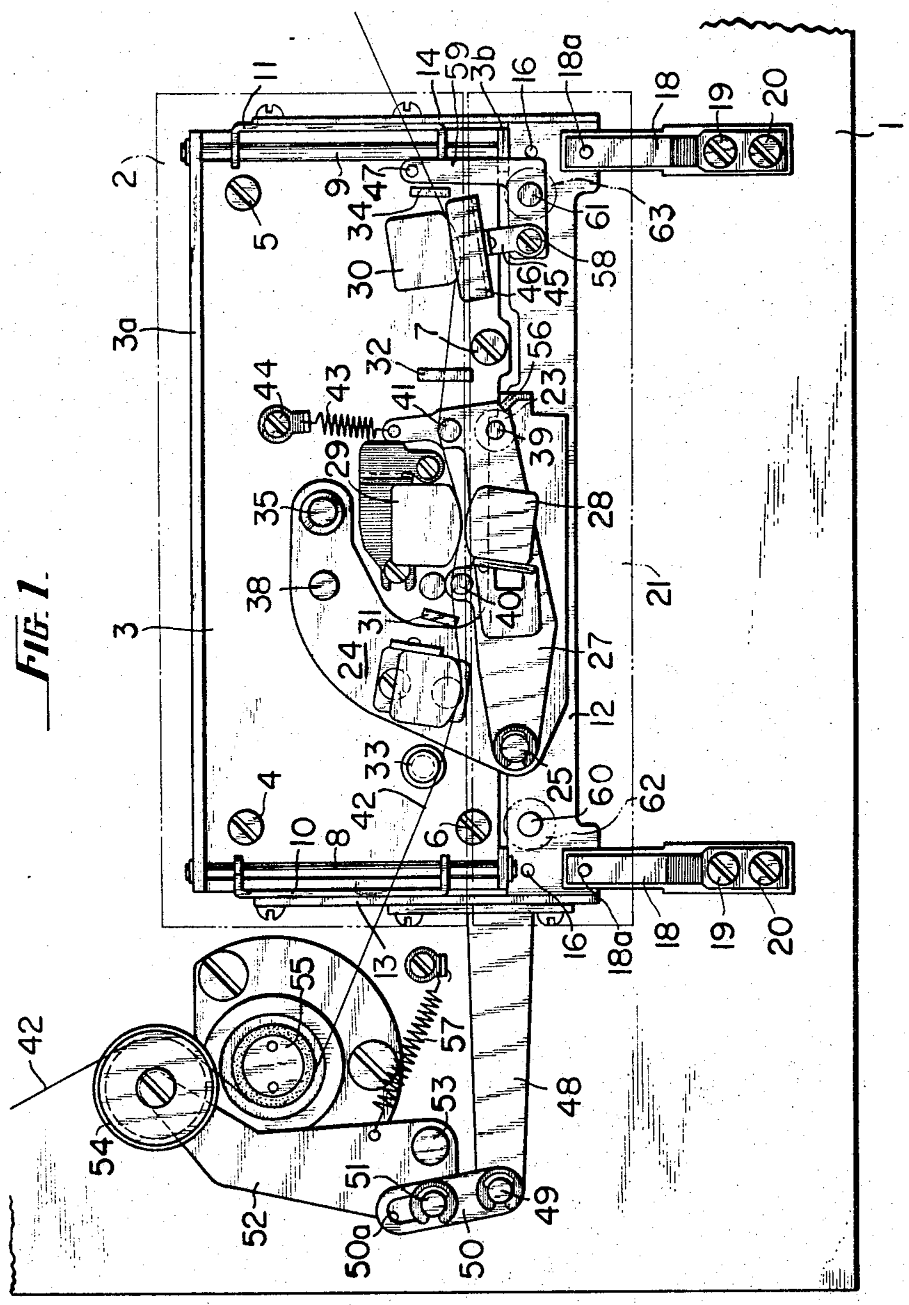
FIGS. 1 and 2 are schematic top plan views of the head cover arrangement shown in its closed and opened positions, respectively, together with related electric and mechanical parts of the machine.
Figure 2:
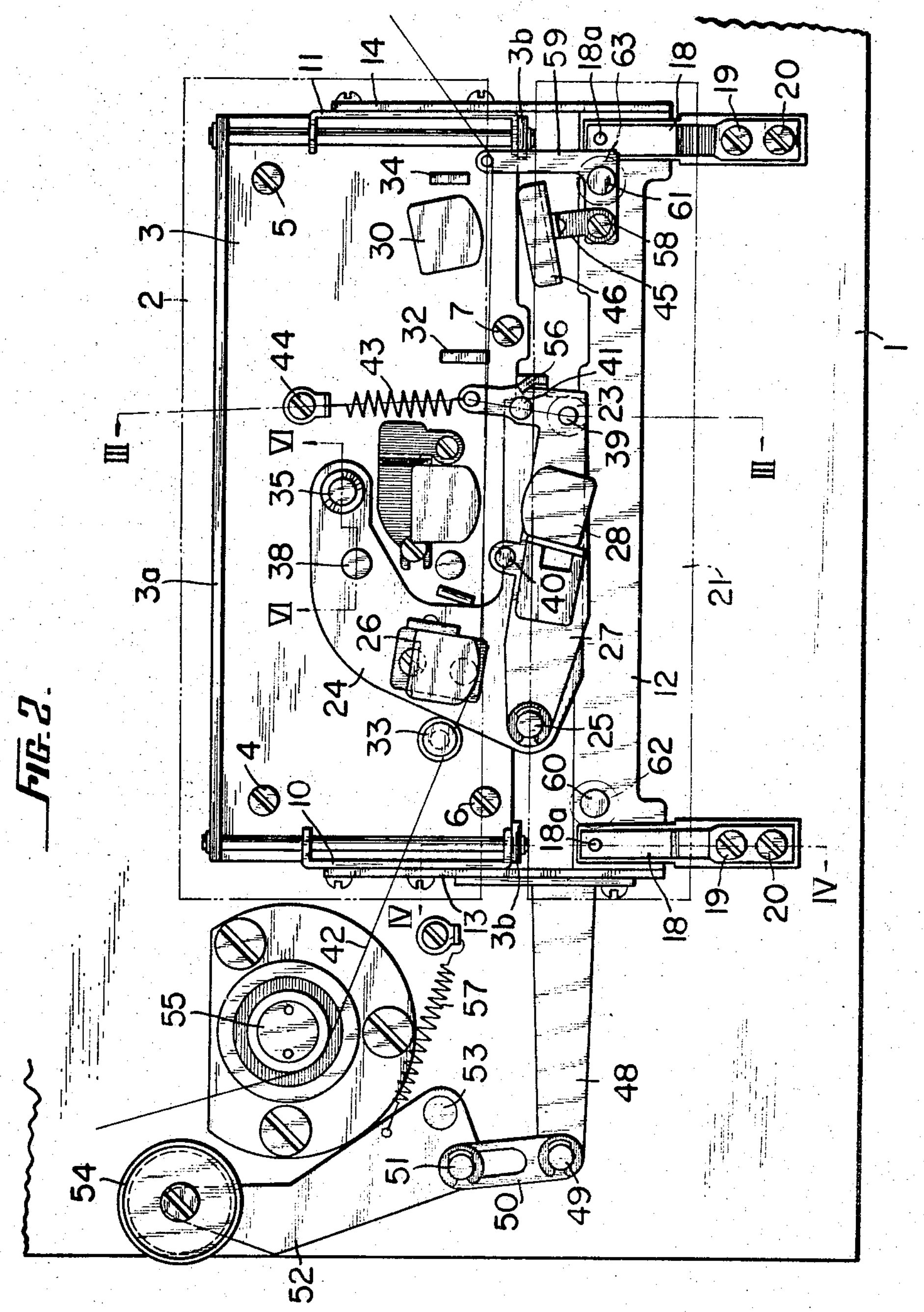

Now referring to the accompanying drawings, 1 denotes a stationary board such as the chassis panel of a magnetic tape recorder and 2 represents a stationary head cover element which is shown only schematically by broken lines in FIGS. 1 and 2. The angular cross-sectional configuration of this cover element is clearly seen from FIG. 3. Vertical end walls are formed integrally with the cover element for stiffening purpose, only one of which is shown as at *2a* again in FIG. 3.

Stationary frame base 3 is rigidly fixed on the upper surface of board 1 by means of a plurality of set screws 4–7. A pair of parallel guide rails 8 and 9 are provided on the frame base 3 in proximity of the end extremities thereof and mounted rigidly in a parallel relation to the frame base by means of side wall *3a* and a pair of supporting vertical prongs *3b*. Prongs *3b* are formed by turning upwardly a pair of projections originally integral with the frame base.

Figure 4:
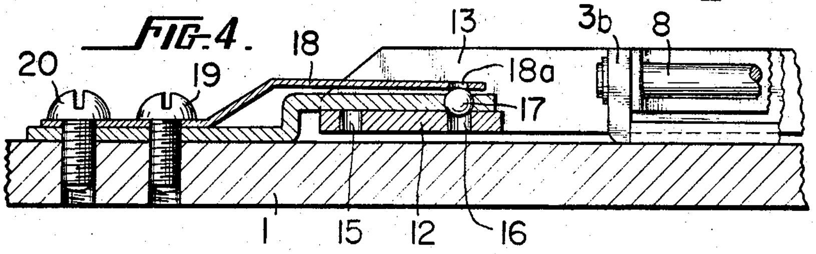
FIG. 4 is an enlarged sectional view taken on the line IV—IV in FIG. 2.
Figure 7:
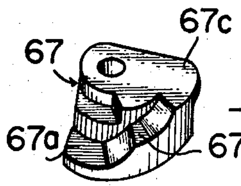
FIG. 7 is a perspective view of a stepped cam attached to the knob shaft.

Slides 10 and 11 are slidably mounted on the guide rails 8 and 9, respectively. 12 denotes a slide plate which is capable of moving in the vertical directions when seen in FIGS. 1 and 2 and connected with said slides 10 and 11 through connecting arms 13 and 14, respectively. In proximity of each of the end extremities of the slide plate, there are two openings 15 and 16 cut therethrough as shown in FIG. 4, any one of these openings being capable of detachable engagement with a steel ball 17 backed up by the free end of a spring strip 18. This spring strip is fixed at its root end to the board 1 by means of fixing screws 19 and 20 above, the said strip being formed with an opening *18a* in engagement with the ball. The provision of the balls for cooperative engagement of openings 15 and 16 in slide plate 12 serves to positively lock plate 12 in either of two accurately determined positions.

Figures 3, 5, 6:
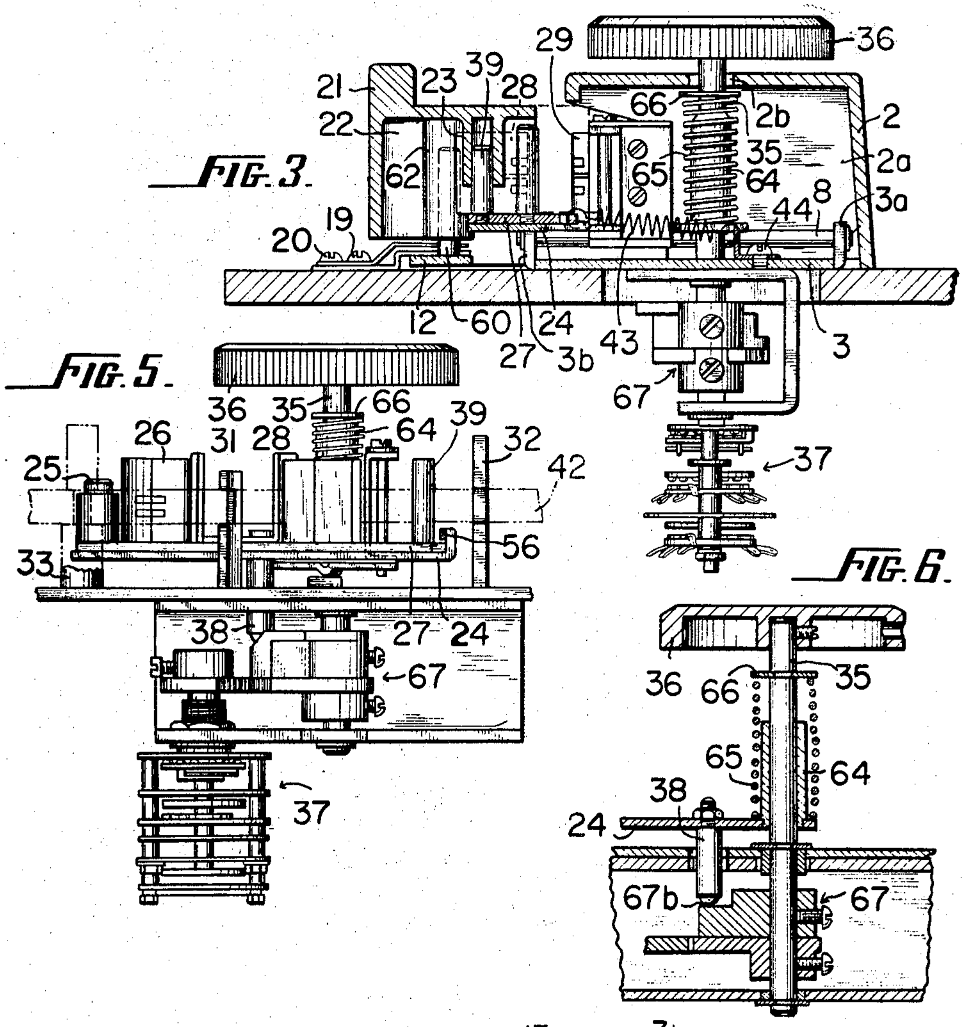
FIG. 3 is a cross-sectional view taken substantially on the line III—III in FIG. 2.
FIG. 5 is an elevational view of the assembly comprising a manual knob and its related several parts shown in FIG. 3, when seen in the figures from left to right, wherein however several minor parts have been omitted for clarity of the drawing.
FIG. 6 is a sectional view taken substantially on the line VI—VI in FIG. 2.

A movable head cover element 21 having substantially an angular cross-section is mounted adjacent stationary head cover element 2, the level of the upper surface of the former being slightly lower than that of the latter so that when the former is advanced towards the latter as shown by the broken line in FIG. 3, the innermost end of the former is brought into a slightly overlapped position and forms a step in combination with the outermost end of the latter. In this overlapped condition, there is no gap between head cover elements 2 and 21 when seen from above. Stiffening end walls 22 are integrally formed at the sides of movable cover 21, thus forming a box opening towards the stationary cover element, as well as downwards. The movable element 21 is formed with three depending tubular projections 23, 62 and 63 for slidably receiving respective pins 39, 60 and 61. In FIG. 1, both cover elements 2 and 21 are shown with a small gap there-between for clarity of the drawing. But, in fact, they are, when the movable cover is advanced to its active position, kept in an overlapped relation with each other as already referred to.

A mount 24 is provided fixed with a guide tube 64 which is slidable on a knob shaft 35 having a knob 36. Spring washer 66 is detachably fixed onto the knob shaft at a short distance downwardly from the knob. A compression spring 65 is provided between washer 66 and mount 24 for exerting downward pressure onto the latter. A conventional erase head 26 and a pivot pin 25 are positioned on mount 24. A plate 27 is mounted for rotation about pivot pin 25. A conventional bias head 28 is fixedly mounted on the pivotable plate 27′ and a conventional record head 29 is fixedly mounted on the frame 3 so as to cooperate with the bias head when the latter is brought from its nonservice position shown in FIGS. 2 and 3 to its operative position shown in FIG. 1. A conventional playback head 30 is similarly mounted fixedly on the frame 3, and a tape guide post 32 is mounted at an intermediate position between the record head 29 and playback head 30 on the frame 3. In addition, further tape guide posts are provided as at 33 and 34 on the same frame. The knob shaft 35 passes through an opening 2*b* bored through the upper wall of the fixed cover element. Knob shaft 35 is rotatably mounted and provided with a plurality of rotary switches generally shown by numeral 37 for controlling the electric and electronic circuits arranged within the tape recorder, although not shown.

Knob shaft 35 is further provided fixedly with a stepped cam 67 with which a follower pin 38 is kept in cooperative engagement. The aforementioned pin 38 is fixedly mounted on mount plate 24, as clearly shown in FIG. 4. Tape guide pins 40 and 41 are mounted fixedly on the pivotable plate 27 on either side of biasing head 28 in a separated manner therefrom and in a nearer position to the record head 29. When the biasing head 28 is advanced to its operative position in FIG. 1 for the normal recording operation, magnetic tape 42 is brought into sliding contact with erase head 26, record head 29, playback head 30, tape guides 31, 32 and 34, thereby providing curved path for the tape about record head 29 as shown in FIG. 1.

Tension spring 43 is connected at one end to the free end of the pivotable plate 27, while the opposite end of said spring is anchored to the frame 3 as at 44. Thus, the pivotable plate 27 is subjected to a force by spring 43 tending to rotate it in a counterclockwise direction as viewed in FIGURES 1 and 2. Movable head cover element 21, which is attached through pin 39 to plate 27, is therefore subjected to a closing force by spring 43.

At the right-hand side of FIGS. 1 and 2, an angular arm 59 is mounted on the slide plate 12, and further a support member 45 is fixedly mounted on the arm by means of a set screw 58. A magnetic shield 46 of angular shape is fixedly mounted on the support member for cooperation with the playback head 30. On the free end of the angular arm 59, there is fixedly provided a tape shifter 47. In the case of the regular recording or playback operation of the tape recorder as illustrated in FIG. 1, the shifter 47 is kept in its idle position remote a small distance from the tape 42.

A longitudinal arm 48 is fixed at its one end to both slide plate 12 and connecting arm 13. A pivot pin 49, around which a connecting link 50 is pivotally mounted at its one end, is positioned at the opposite end of longitudinal arm 48. A longitudinal slot 50*a* is formed in the other end of connecting link 50. A pin 51 is fixedly mounted on a tension arm 52 in proximity of its pivot shaft 53 and slidably received in the slot. A feeler roll 54 is rotatably mounted on the free end of the tension arm for pressure engagement with the magnetic tape 42. For this purpose, a tension spring 57 is positioned between arm 52 and the panel 1, thereby urging the arm to rotate in the clockwise direction when seen in FIGS. 1 and 2.

In close proximity of the tension arm 52, a conventional impedance roller 55 is rotatably mounted in driving contact with the tape 42 when the machine runs. The tape reeling mechanism have been omitted from the drawings on account of very conventionality of them to those skilled in the art.

When the movable cover element 21 is manually shifted in the course of the regular operating period of the machine from its operative position schematically shown in FIG. 1 to its idle position shown in FIG. 2 again schematically, the slide plate 12 is moved in unison therewith and precisely guided along guide rails 8 and 9 by means of slides 10 and 11 in the downward direction when seen in FIGS. 1 and 2. This shifted position of the slides is positively kept by the engagement of steel ball 17 with reception opening 15. Ball 17 is positively locked in this position by its engagement with the catch opening 18*a* formed in the pressure spring 18. In the course of the shifting manipulation of movable cover element 21, pivotable plate 27 carrying the biasing head 28 is rotated around its pivot pin 25 in the clockwise direction in FIG. 1 against the urging action of tension spring 43, thus occupying a new position shown in FIG. 2 in place of the former position shown in FIG. 1, the spring 43 being further tensioned. As seen from FIG. 2, biasing head 28 is kept in its nonservice position remote a considerable distance from the record head 29. In this case, movable tape guide posts 40 and 41 are also receded a considerable distance from the regular running passage of the tape 42 shown in FIG. 1. Under these conditions, the arrangement of related parts are so positioned as to facilitate replacement of the former tape by a new one, without obstructions. The tape is kept under slight tension so as to contact successively, when seen in the direction of regular tape running direction, with impedance roller 55, stationary tape guide post 33, erase head 26 and tape shifter pin 47 during fast forward feed or the fast rewinding operation, as well as during the dead stoppage of the tape reeling mechanism. The tape is kept at only a slight distance from the record head 29 as shown in FIG. 2. Even when the tape is driven at a relatively high speed for fast services as above mentioned, the operating front surface of the record head may therefore be subjected to any frictional abrasion caused by otherwise possible contact of the tape with the record head.

In proximity of the pin 39, there is an engageable hook 56 fixedly mounted on the free end of mount 24, said hook serving for retaining frictionally the pivotable arm 27 when the latter has been receded from its active position shown in FIG. 1 to its off-service position shown in FIG. 2. Hook 56 positively prevents unintentional release of plate 27 if accidentally subjected to an unintentional force tending to return it to its position shown in FIGURE 1.

In unison with aforementioned receding manipulation of the movable cover 21, support arm 59 is also moved downwards in FIG. 1 to the position shown in FIG. 2, in combination with the slide plate 12 mounting the arm 59. At the same time, the magnetic shield 46, naturally made of magnetically shielding material having a high permeable substance such as permalloy, ferrite or the like, is also moved downwards to its off-service position shown in FIGURE 2. With the shield 46 positioned in this off-service position, a free running of the tape or an easy threading thereof may be positively guaranteed.

When knob 36 is turned clockwise, shaft 35 and a stepped cam 67 having three engageable cam steps 67*a*, 67*b* and 67*c* are turned in in unison therewith. Rotation of cam 67 successively elevates follower pin 38 elevated in its height, whereby the mount 24 is caused to follow the vertical shifting of the follower pin. The pivotable plate 27 is also shifted vertically in succession. In this way, the relative heights of erase head 26 and biasing head 28 to tape 42 can be adjusted so as to select any one of a plurality, for instance four, of the recording and playback tracks on the tape, preferably of the standard width or more specifically 6.5 mm.

When it is desired to return the movable cover 21 to its operating position, it is necessary to apply a light finger pressure upon the cover in the upward direction in FIG. 2, whereby the pressure is transmitted from the cover through tubular projections 62 and 63 and pin 60 and 61 to slidable plate 12 so as to move the latter in the upward direction in FIG. 2 and in the right-hand direction in FIG. 4. Ball 17 is disengaged from reception opening 16 and the locked condition of the slide plate 12 is thereby released. At this moment, the strongly tensioned spring 43 will exert a heavy pull upon the pivotable arm 27, thereby the latter is rotated in the counterclockwise direction in FIG. 2 about pivot pin 25. This turning motion is transmitted through the pin 39 and tubular projection 23 to the movable cover element 21, moving element 21 to its mating and cooperative position with the stationary head cover element 1 as shown in FIG. 2.

With the pivotal returning movement of the arm 27, the biasing head 28 carried thereon is also moved to its active position shown in FIG. 1. Simultaneously therewith, the slide plate is advanced from the position shown in FIG. 2 to that shown in FIG. 1. Tape shifter pin 47 is receded from its active position to its non-service position remote from the tape as was already referred to hereinbefore. Magnetic shield 46 is advanced to its operative position in close proximity of the playback head 30 for preventing stray magnetic fluxes from affecting that head.

Tape guide posts 40 and 41 are also advanced by the aforementioned cover-returning operation in unison with the pivotable arm 27 so as to exert pressure on tape 47 at two separate places on both sides of the record head 29 too, in operation with stationary guides posts 31, 32 and 33 and erase and record heads 26 and 30, provide a considerable frictional pull to the tape against the feeding or winding effort provided by the conventional capstan type tape feeding mechanism and the tape-winding reel mechanism, not shown.

When the movable head cover 21 is advanced in the aforementioned way to its closing positions, the arm 48 is also carried thereby and the connecting pin 51 is moved from one end of slot **50*a* shown in FIG. 2 to the opposite end of the slot shown in FIG. 1. The tension arm 52 is rotated in the clockwise direction in FIG. 2, thus being brought from its off-service position, FIG. 2, remote from the tape to its active position, FIG. 1, in engagement therewith. In this engaging position of the tension arm 52, the guide roll 54 is kept in rolling contact with the tape, thus reducing the otherwise possible larger frictional resistance between the tape and the tension arm. By this engagement of the tension arm through guide roller 54 with the magnetic tape, the latter is kept in more intimate contact with the impedance roller 55 which is also kept at a constant rotational speed as conventionally known, the tape is delivered from the delivery reel, not shown, through friction contact of the tape with the both rolls 54 and 55 and guide post 33, towards the magnetic head groups 26, 28, 29 and 30 at a constant speed with a considerable tape tension at its delivery side provided by the rolls 54–55, on the one hand, and by the guide posts 33, 31, 40, 41 and 32** in combination with the head group, on the other hand. Thus the use of a frictional pad which is commonly used for pinching the tape between it and any one of the magnetic heads, especially the record head is eliminated.

I claim:

1. A magnetic tape recording and reproducing machine comprising:

(a) a stationary panel;

(b) a plurality of magnetic heads mounted on said panel, at least some of said heads being adapted to move between operative and inoperative positions;

(c) a cover carried by said panel for protecting said magnetic heads and having a first cover element fixedly mounted on said panel and a second cover element movably mounted on said panel between an operative and inoperative position, each of said cover elements forming in conjunction with said panel a box-like construction having an open side facing the open side of the other of said cover elements so as to form a closed box-like construction when said second cover element is moved to its operative position;

(d) a plurality of tape guides carried by said panel for determining the travel path of said tape, at least some of said guides being movable between operative and inoperative positions;

(e) a tension arm pivotally carried on said panel and carrying a feeler roll at one end thereof, said feeler roll being spring biased toward said tape;

(f) an impedance roller mounted on said panel for contacting said tape at a position between said feeler roll and said tape guide; and (g) a link mechanism interconnecting said second cover element and said tension arm and adpted to pivot said tension arm in a direction disengaging said feeler roll from said tape when said second cover element is moved toward its inoperative position and to permit said tension arm to carry said feeler roll into engagement with said tape when said cover element is moved toward its operative position.

2. A magnetic tape recording and reproducing machine as defined in claim 1 further comprising means for moving said movable magnetic heads and said movable tape guides into their operative positions when said second cover element is moved into its operative position.

3. A magnetic tape recording and reproducing machine as defined in claim 1 wherein one of said cover elements is slightly larger than the other, and wherein the smaller of said cover elements fits telescopically into the larger when said second cover element is moved to its operative position.

4. A magnetic tape recording and reproducing machine as defined in claim 1 further comprising a magnetic shield movable with said second cover element in proximity of one of said magnetic heads for preventing stray magnetic fluxes from affecting said one magnetic head when said second cover element is moved to its operative position.

5. A magnetic tape recording and reproducing machine as defined in claim 1 further comprising:

(a) a member pivotally carried on said panel and carrying two of said tape guides spaced along said tape on opposite sides of a nonmovable magnetic head; and (b) means for rotating said member about its pivot when said second cover element is moved toward its operative position, whereby said two tape guides exert a pressure on said tape on both sides of said nonmovable magnetic head.

6. A magnetic tape recording and reproducing machine as defined in claim 1 further comprising means for releasably locking said second cover element in its operative and inoperative positions.

7. A magnetic tape recording and reproducing machine defined in claim 1 further comprising means carried by said panel for shifting two of said magnetic heads between selected tracks spaced laterally on said tape.

References Cited

UNITED STATES PATENTS

| | | | |
|---|---|---|---|
| 3,319,858 | 5/1967 | Schober et al. | 226—181 |
| 3,271,034 | 9/1966 | Andrews | 274—4 |
| 2,728,577 | 12/1955 | Barany et al. | 274—4 |
| 2,644,690 | 7/1953 | Krag | 274—4 |

LEONARD FORMAN, *Primary Examiner.*

R. A. FIELDS, *Assistant Examiner.*